Aug. 15, 1961     H. BARTH ET AL     2,996,616
X-RAY DIFFRACTION ARRANGEMENT
Filed Sept. 15, 1958
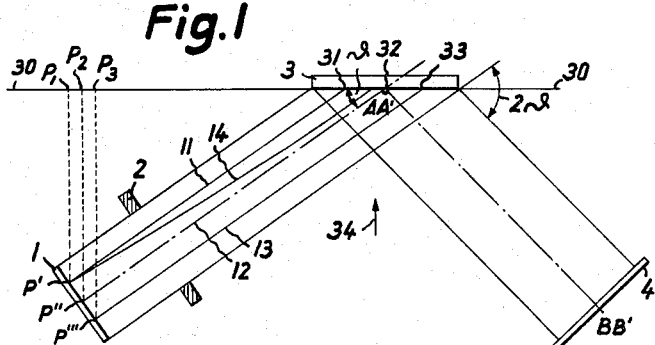
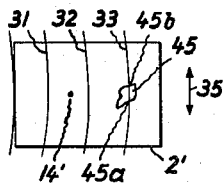
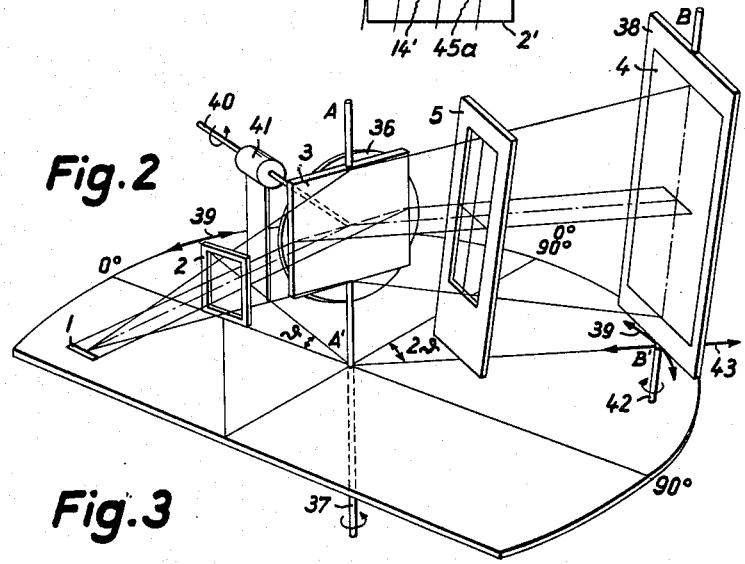
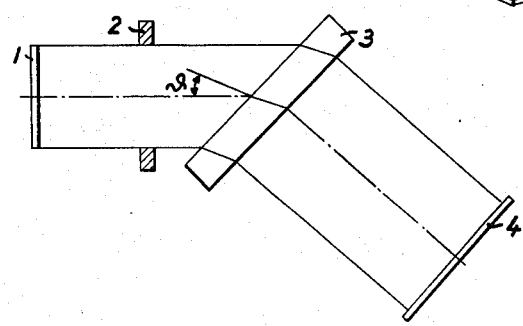
*Inventors*
HEINZ BARTH
ROLF HOSEMANN
By Toulmin & Toulmin
                Attorneys United States Patent Office 2,996,616
Patented Aug. 15, 1961

2,996,616
X-RAY DIFFRACTION ARRANGEMENT
Heinz Barth, 139 Ziekowstrasse, Berlin-Tegel, Germany, and Rolf Hosemann, 14 Bismarckallee, Berlin-Grunewald, Germany
Filed Sept. 15, 1958, Ser. No. 761,452
Claims priority, application Germany Sept. 18, 1957
10 Claims. (Cl. 250—51.5)

Experiences with solid substances have shown that the physical properties of solids depend not only on the atomic structure of the elementary cell but also on the size and orientation of superordinate units.

In solid substances, the elementary cells are crystallized to crystallites with a high degree of order. Crystallites of different size and distortion make up the structure of the solid. According to the degree of order of the crystallite structure, the solid substance may be a monocrystal, a mosaic crystal or an aggregate of all intermediate stage crystals. As distorted crystallites have different lattice planes of the same indication, the position of crystallites can be determined experimentally by characteristic X-radiation.

In recent years, some methods have become known in order to determine the structure inside the crystal at limited points. For instance, the structure of metal monocrystals has been examined by means of the well-known double crystal method in which the first crystal is a perfect crystal and the crystal to be examined is rotated through the antiparallel position. Furthermore, a procedure is known in which, by rotating the crystal and film toward a divergent polychromatic bundle of X-rays, the structure of a crystal surface can be investigated. Due to their limited accuracy and comparatively high cost, such procedures did not prove to be practical.

Furthermore, X-ray crystal analysis based on either the principle of Bragg's diffraction or on the principle of v. Laue interference produce only results with regard to average or overall characteristics of a crystal without producing any detail at any particular spot thereof.

It is an object of the present invention to provide an arrangement by means of which a more detailed and more thorough examination of the structure of large monocrystal surfaces can be made than by means of hitherto known arrangement.

It is another object of the present invention to provide a new and improved method to examine the surface structure of a monocrystal with regard to detailed surface imperfections, such as mosaic structure and their location on the surface of such monocrystal.

It is a further object of the invention to provide a new method for rendering visible curvatures of monocrystal surface lattice planes.

According to the present invention in a preferred embodiment thereof a special goniometer arrangement is employed. From a line focus, monochromatic X-rays are directed towards a crystal to be examined. The line focus is positioned in a plane perpendicular to the surface of a lattice plane of a monocrystal. All X-rays impinging upon the lattice plane at the Bragg angle δ of less than 45° will appear as reflected by diffraction at the same angle δ. The rays reflected by this Bragg diffraction are sensed by a X-ray sensitive film. The picture thus obtained corresponds to a stigmatic and detailed image of the lattice plane, thus imaging stigmatically the monocrystal surface.

While the specification concludes with claims particularly pointing out and distinctly claiming the subject matter which is regarded as the invention, it is believed that the invention, the objects of the invention and further objects and advantages thereof will be better understood from the following description taken in connection with the accompanying drawing in which:

FIG. 1 is a diagrammatic illustration of the present invention in which the plane of the drawing corresponds to the goniometer plane;

FIG. 1a illustrates schematically a top view of the monocrystal lattice plane as shown in a perpendicular position to the plane of the drawing in FIG. 1;

FIG. 2 is a perspective view of the arrangement shown in FIG. 1; and

FIG. 3 is a modified embodiment of the present invention.

Referring now to the drawing and to FIGS. 1 and 2 thereof in particular, there is shown the source of X-rays 1 capable of emitting a line focus. The beam emitted therefrom is limited by a cross-hair diaphragm 2. This beam impinges upon a monocrystal 3 and is reflected therefrom at an angle δ taken with respect to a low-indicated lattice plane 30 which, in the illustrated crystal, lies parallel to its surface. The reflected rays are recorded on a measuring film plate 4.

The monocrystal 3 is held in a conventional holder such as 36 which is mounted on a shaft 37. The crystal thus can be rotated about the axis A—A' (FIG. 2) of this shaft 37. The shaft 37 is supported by a support 41 which can also rotate by means of a shaft 40 about an axis vertical to the crystal surface or to the lattice plane and the shaft 37.

The film plate 4 is so mounted on a holder 38 as to be rotatable about axis B—B'. The angle of incidence as well as the angle of reflection can be read in the usual manner of a goniometer arc 39. The position of the monocrystal 3 and of the film plate 4 is adjustable in the direction of the goniometer legs. The film plate 4 and its holder 38 are mounted on a shaft 42 for rotation about the axis B—B' thereof so that it may be adjusted vertically relative to the reflected beam or parallel to the crystal surface and to the lattice plane.

The crystal holder 36 and the film holder 38 can be displaced along the direction of the reflected radiation by means of an adjusting device 43.

For reasons of a better understanding of the production of the image according to the invention, reference is now made particularly to FIG. 1 and FIG. 1a.

Considering, for example, a point P' of the line focus 1, the rays emanating from this point and impinging upon the plane 30 at an angle δ, form a conical surface penetrating plane 30 at a circle 31, an arc of which is shown in FIG. 1a. This cone has its apex at point P'. Of course, the apex angle is $180° - 2δ$. Looking towards the crystal 3 in direction of the arrow 34, all X-rays from point P' impinging upon the surface of the monocrystal 3 at the angle δ do so along the arc of circle 31 as shown in FIG. 1a. It will readily be apparent that these rays from source point P' are not in parallel, but they all hit this plane 30 at the same angle δ. The circle 31 has a center $P_1$ which is the geometric projection of point P' upon plane 30.

Of course, due to the diaphragm 2, only those rays from point P' reach the crystal along that portion of circle 31 which is positioned inside of the frame 2'.

It will further be apparent, that any other X-rays emitted from point P' such as 14 and hitting the crystal 3 at an angle other than δ will not fall upon the arc of circle 31 but, for example, on point 14' (FIG. 1a). According to the principle of the invention δ is to be the Bragg angle for the monochromatic X-rays emanated from line focus 1, including, of course, source point P'. Thus, only the radiation reaching the crystal along the arc of circle 31 from point P' will be reflected by Bragg diffraction.

Rays from point P', such as 14, not hitting the crystal at the arc of circle 31 but, for example, at 14' will not be reflected by Bragg's diffraction. Rays from other points of the line focus 1 and also hitting the crystal at the arc of circle 31 as shown in FIG. 1a will not be reflected by Bragg diffraction because they also hit the crystal at an angle other than $\delta$.

Accordingly, the rays reflected by Bragg diffraction from the crystal surface at the arc of circle 31, are highly regular and form a frusto conical surface. These rays, when hitting the surface of film 4, will produce an image having the configuration of a thin and sharp curve. Of course, due to the fact that the plane of film 4 as shown is inclined towards plane 30, such curve will be an arc of a conic section. Most important, however, is that the radiation diffracted by the crystal from the surface portion pertaining to the arc of circle 31 on the crystal surface produces an image of this circle as a sharp curve.

Exactly the same can be repeated for any other source points of line focus 1, such as P'' or P'''. Rays from these points impinging on plane 30 at the same angle will do so along circles 32 and 33, respectively. Of course, the diaphragm 2 limits the effective radiation impinging upon the crystal at these circles 32 and 33 to those arc portions thereof located within the frame 2' (FIG. 1a). The circles 32 and 33 are not concentric but have different centers $P_2$ and $P_3$, respectively, located in plane 30 and coinciding with the geometric projections of source points P'' and P''', respectively, upon this plane 30.

Rays diffracted from the crystal portions at the arcs of circles 32 and 33, respectively, will also produce sharp and distinct curves on film 4, which curves are also arcs of conic sections. Of course, the circles 31, 32 etc. and the arcs thereof as mentioned above were only used to illustrate the orderly fashion of the image production. These circles are not visible as such. They would be visible only if line focus 1, in fact, would consist of a finite series of distinct source points, which, of course, is generally not the case but on the other hand shall not be excluded here.

If one considers the entire line focus consisting of an infinite series of source points such as P', P'' and P''', all source points being assembled at infinitesimal (theoretically) distances between adjacent points, then it will readily be apparent that the entire crystal surface inside of frame 2' is impinged upon by X-rays at Bragg angle $\delta$. Any given spot on the crystal surface will reflect an X-ray at Bragg angle $\delta$; this reflected X-ray will not cross any other reflected X-ray and this spot will reflect no other X-rays. Thus, the image on film 4 is a point-by-point picture of the crystal surface without overlapping; i.e. the image produced is a stigmatic picture of the monocrystal surface.

It will, of course, be understood that this explanation given above is idealized and rests on the assumptions (1) that the X-rays are in fact monochromatic and (2) that the crystal lattice is an absolutely perfect one. The first one of these assumptions can in practice be approximated only within limits, because every X-ray spectrum line has a certain width covering a band of wave lengths. However, if one selects a suitable line, for example, the K$\alpha$ line, this width becomes neglegibly small and produces little distortion of the image produced in the film. As it is well known, the grain of the film inherently limits the resolving power thereof. Thus, no greater resolving power as reproduceable by the film is necessary.

The second assumption, an absolutely perfect crystal, is of course a fiction; however, this method and system as explained thus far has precisely as objective to uncover lattice imperfections of the crystal surface. Without any lattice distortions the crystal surface is produced by the X-rays as a picture of uniform brightness without any contrast, thus indicating a perfect monocrystal surface.

Assuming, however, that a mosaic surface imperfection such as denoted with 45 is present, the following result will be produced. In terms of lattice structure, the imperfection to be uncovered means that the lattice plane of the crystallized material in this area does not coincide or does not run in parallel to plane 30. Thus, for example, the rays from point P''' hitting the crystal at that arc portion of circle 33 (FIG. 1a) which is within the markers 45a and 45b, does not do so at Bragg angle $\delta$. Consequently these rays are not reflected by Bragg diffraction but pass through the crystal or are dispersed otherwise. Thus, no radiation from within the markers 45a and 45b will reach the film 4. It is readily apparent, that the entire area 45 will be reproduced as dark, contrasting area on the film 4, thus denoting an image of size, location configuration and extension of the imperfection.

It will be understood, that the film 4 need not be positioned perpendicularly to the incoming rays. Film 4, for example, can be placed in parallel to lattice plane 30.

By placing a streak or cross diaphragm 5 into the path of the reflected radiation, i.e., by interposing such diaphragm means between the crystal and the measuring film plate, it is possible to determine the shape of a lattice plane of a moncrystal according to the picture of the film. For instance, by using CuK radiation with a line focus length of 10 mm. on a quartz crystal having a space-lattice plane of $10\overline{1}1$, a lattice surface of about 16 cm.$^2$ will be reflected on the measuring film plate 4 at $\delta = 13°21'$ when the film plate is arranged parallel to and at a small distance from the lattice surface. Distorted crystallites with a surface extension of 0.1 mm. will still be visible with the arrangement having the dimensions as given.

By placing a fine-meshed cross lattice made of wire of 50$\mu$ diameter into the reflected beam directly behind the crystal, and by arranging the film plate 250 mm. from the crystal, it is possible to show that the lattice plane has an angle of curvature up to 1'. The fine-meshed cross lattice made of wire will appear as distorted contrast on the film. The position of reflection of the crystal under examination can be adjusted visually with the aid of a fluorescent screen due to the high, nearly total reflection of the low-indicated lattice planes. Thanks to the high percentage reflection, exposure time of only a few minutes duration is necessary.

The above-described parallel radiation arrangement is advantageous over conventional arrangements in that it is simpler and allows a more thorough examination of crystal surfaces.

The present invention may be used not only in basic research, but is also susceptible to industrial applications, such as for testing crystals for oscillators, monochromators and analysators for X-rays and neutron rays, semi-conductors, metal monocrystals and processing methods.

According to G. Borrmann, however, X-rays can also penetrate comparatively thick crystals when a lattice plane inside an ideal crystal lies at a Bragg angle $\delta$ to the incident radiation. The direction of the wave field inside the crystal then corresponds to the direction of abnormal absorption and lies approximately parallel to the lattice plane. In other words, the term "surface of a monocrystal" includes surfaces embedded inside larger crystal structures.

FIG. 3 depicts an embodiment of the present invention in which a parallel monochromatic beam emanating from a streak focus and limited by a diaphragm 2 strikes the lattice plane inside the crystal 3 at a Bragg angle $\delta$, penetrates the crystal parallel to the reflecting lattice plane, and is recorded on the measuring plate 4 which is mounted parallel to the surface.

According to the type and extent of disturbances inside the crystal, the X-ray wave field is absorbed with varying intensity. The position and side of the disturbances can be determined according to the differences of absorption.

One of the particular advantages of this arrangement is that it allows the simultaneous examination of a crystal volume over a considerably larger surface.

The arrangement can also be used for examining the structure as well as the distribution of activators in monocrystal semiconductors, such as Ge, Si, GdS, etc.

It will be understood that the present invention is susceptible to modification in order to adapt it to different usages and conditions, and, accordingly, it is desired to comprehend such modifications within this invention as may fall within the scope of the appended claims.

We claim:

1. An X-ray diffraction arrangement for examining the mosaic surface structure of a crystal by the reflection of monochromatic X-rays, said arrangement comprising, in combination: a source of X-rays for producing a line focus which lies in the goniometer plane and normal to the direction of radiation; means for rotatably mounting the crystal in the path of radiation for adjustment between angles of 0° and 45° so that a parallel X-ray radiation emanating from the focal spot can be reflected therefrom; and a measuring film so positioned as to have projected onto it said reflected radiation.

2. An arrangement as defined in claim 1 for the examination of the mosaic structure inside of single crystals by transmission of monochromatic X-rays wherein the crystal undergoing examination has a lattice plane that is substantially vertical with respect to the crystal surface and wherein said means for mounting the crystal occupy such a position that said lattice plane is so positioned that the field of X-rays can penetrate the crystal in a direction that produces abnormal absorption.

3. An arrangement as defined in claim 1 wherein said means for mounting the crystal are rotatable about an axis that is vertical to the surface of the crystal undergoing examination.

4. An arrangement as defined in claim 1 further comprising interchangeable cross-hair diaphragms interposed between said source of X-rays and the crystal to be examined.

5. An arrangement as defined in claim 1 further comprising means for mounting said measuring film for rotation around an axis parallel to the axis of rotation of said crystal holder means.

6. An arrangement as defined in claim 1 further comprising fine-wire ruled grating diaphragm means interposed between the crystal and said measuring film vertically with respect to the radiations from said X-ray source.

7. An arrangement as defined in claim 1 further comprising means for moving said measuring film in the direction of the goniometer leg in which said measuring film is arranged.

8. An arrangement as defined in claim 1 further comprising a spring-cushioned spindle cooperating with a goniometer worm wheel for effective coarse and fine adjustment of the goniometer legs.

9. A method of examining the surface structure of single crystals comprising the steps of, placing an X-ray line focus into a plane perpendicular to the overall extension of said surface; directing from each point of said line focus monochromatic X-rays against said surface at the Bragg angle thereof, said X-rays from said line focus scan said surface whereby the rays from each point of said line focus scan an arc of said surface, and detecting by planar photosensitive means the rays as reflected by Bragg diffraction from said crystal surface.

10. A method of examining structure and surface configuration of a single crystal comprising the steps of, placing an X-ray line focus into a plane perpendicular to the overall extension of said surface; directing a monochromatic X-ray beam at the Bragg angle associated to said crystal surface towards said surface thereby scanning said surface with said X-rays at Bragg angle point by point; passing the X-rays reflected by Bragg's diffraction from said surfaces through a mesh wire screen being perpendicular to said plane positioning said line focus; and deriving a plane image from said passed rays.

References Cited in the file of this patent

UNITED STATES PATENTS

| | | |
|---|---|---|
| 2,417,657 | McLachlan | Mar. 18, 1947 |
| 2,549,987 | Parrish et al. | Apr. 24, 1951 |
| 2,585,916 | Coleman | Feb. 19, 1952 |

OTHER REFERENCES

"Applied X-rays," by Clark, 1955 edition, pp. 358 to 360.